United States Patent
Gong et al.

(10) Patent No.: US 11,552,477 B2
(45) Date of Patent: Jan. 10, 2023

(54) RECHARGEABLE BATTERY FOR INDUCTION GARBAGE BIN

(71) Applicant: National Engineering Research Center of Advanced Energy Storage Materials (Shenzhen) Co., Ltd, Shenzhen (CN)

(72) Inventors: Yinglin Gong, Shenzhen (CN); Hongbing Liu, Shenzhen (CN); Pengfei Chen, Shenzhen (CN); Xiaofeng Chen, Shenzhen (CN)

(73) Assignee: NATIONAL ENGINEERING RESEARCH CENTER OF ADVANCED ENERGY STORAGE MATERIALS (SHENZHEN) CO., LTD, Shenzhen (CN)

(*) Notice: Subject to any disclaimer, the term of this patent is extended or adjusted under 35 U.S.C. 154(b) by 656 days.

(21) Appl. No.: 16/573,835

(22) Filed: Sep. 17, 2019

(65) Prior Publication Data

US 2020/0343753 A1 Oct. 29, 2020

(30) Foreign Application Priority Data

Apr. 23, 2019 (CN) .......................... 201910328441.7

(51) Int. Cl.
*H02J 7/00* (2006.01)
*H02J 50/10* (2016.01)
*B65F 1/14* (2006.01)

(52) U.S. Cl.
CPC .................. *H02J 7/00* (2013.01); *B65F 1/14* (2013.01); *H02J 50/10* (2016.02)

(58) Field of Classification Search
CPC ........................................................ H02J 7/00
USPC ........................................................ 320/107
See application file for complete search history.

(56) References Cited

FOREIGN PATENT DOCUMENTS

| CN | 204361164 U | * | 5/2015 | ............. Y02E 60/10 |
| CN | 106099863 A | * | 11/2016 | ........ H01M 10/4264 |
| WO | WO-2019001586 A1 | * | 1/2019 | ........... H01R 13/502 |

* cited by examiner

*Primary Examiner* — Edward Tso
*Assistant Examiner* — Ahmed H Omar
(74) *Attorney, Agent, or Firm* — Muncy, Geisler, Olds & Lowe, P.C.

(57) ABSTRACT

The present disclosure provides a rechargeable battery for an induction garbage bin, comprising a steel shell, a battery core, an output structural component and an intermediate connection structural component, the battery core being provided in the steel shell, wherein, a lower end of a USB fixing structural part of the intermediate connection structural component is fittingly sleeved on an open end of the steel shell; a positive end of the battery core is connected with a positive tab connection point (B+) on a PCB substrate, a negative end of the battery core is connected with a negative tab connection point (B−) on the PCB substrate; the output structural component is fittingly clamped and sleeved on a USB metal part of the intermediate connection structural component; and a positive clamp output end (O+) of the electronic component is in close contact with a metal languet of a positive cap of the output structural component. The rechargeable battery for an induction garbage bin according to the present disclosure is convenient to fabricate, safe and reliable, and has a high energy utilization rate.

7 Claims, 7 Drawing Sheets

US 11,552,477 B2

RECHARGEABLE BATTERY FOR INDUCTION GARBAGE BIN

TECHNICAL FIELD

The present disclosure relates to a rechargeable battery for an induction garbage bin.

BACKGROUND

With improvement of people's living standards, the technologies of smart home, and internet-of-things are developing rapidly, and modernization of home life is an inevitable trend. At present, almost all traditional dustbin industries have launched their own intelligent inductive dustbins, which must be a future trend. The intelligent induction garbage bin is also bound to be a consumption habit of common people. Just like televisions and washing machines at that time, which are now widely available, the intelligent induction garbage bin will also become popular in the next few years.

One indispensable component in the smart home is a battery; at the very beginning, most of small batteries that people frequently used were alkaline batteries; and with improvement of a battery technology, high-energy batteries such as nickel-metal hydride batteries and lithium-ion batteries emerge with ever-increasing energy density and ever-decreasing weight and volume.

Requirements for working voltages are different in various electric appliances; if an ordinary lithium battery is used directly, a battery voltage may exceed a rated voltage range of an electric appliance, which will bring safety hazards to use of the electric appliance, resulting in an unstable operating state in a minor circumstance, and in a serious circumstance, resulting in abnormality, which causes irreversible damage, increases safety risks, and even incurs a short circuit, burns the circuit, and triggers a major safety accident.

When an electric appliance is operating, the working voltage will be affected more or less, which causes disturbance; especially with respect to an electric appliance comprising an induction component, when it is turned on or off, a voltage pulse higher than a power supply voltage will be generated more or less, which has an impact on a power supply, threatens safety of the circuit, and affects normal operation of the electric appliance.

Therefore, in actual application, it is necessary to clamp an output voltage of the battery used, to ensure that the working voltage of the electric appliance is within its suitable rated range. At a same time, it is necessary to process a high-voltage pulse generated by the operating electric appliance, which is superimposed on the working power supply, to ensure normal operation of the electric appliance.

SUMMARY

Based on the technical background, with respect to defects and deficiencies of batteries currently used on market, the present disclosure provides a rechargeable battery for an induction garbage bin that is convenient to fabricate, safe and reliable, and has a high energy utilization rate.

The present disclosure is implemented through solutions below:

A rechargeable battery for an induction garbage bin, comprises a steel shell, a battery core, an output structural component and an intermediate connection structural component, the battery core being provided in the steel shell, wherein, the intermediate connection structural component includes a USB fixing structural part, a USB metal part, an electronic component and a PCB baffle; the USB fixing structural part is a tubular structure having a hollow interior and an unclosed bottom, the USB fixing structural part has an upper end outer diameter larger than a lower end outer diameter, a top of the USB fixing structural part is vertically provided with a protruding portion of a door frame structure, an inner side of the protruding portion is provided with an electronic component mounting slot, and the electronic component includes a PCB substrate, a charge management circuit, a charge and discharge protection circuit, an output clamp circuit, a reverse absorption circuit and a reverse overvoltage bleeder circuit; the charge management circuit, the charge and discharge protection circuit, the output clamp circuit, the reverse absorption circuit and the reverse overvoltage bleeder circuit are all provided on the PCB substrate; the PCB substrate is provided thereon with a positive tab connection point B+, a negative tab connection point B−, a positive clamp output end O+, a power supply positive connection point POW+ and a ground connection point GND; a lower end of the PCB substrate is mounted on the PCB baffle, and an upper end of the PCB substrate passes through the top of the USB fixing structural part and is clamped within the electronic component mounting slot; the PCB baffle is fittingly mounted within the USB fixing structural part; the USB metal part is fittingly sleeved on the protruding portion of the USB fixing structural part; the lower end of the USB fixing structural part of the intermediate connection structural component is fittingly sleeved on an open end of the steel shell; a positive end of the battery core is connected with the positive tab connection point B+ on the PCB substrate, and a negative end of the battery core is connected with the negative tab connection point B− on the PCB substrate; the output structural component is fittingly clamped and sleeved on the USB metal part of the intermediate connection structural component; and the positive clamp output end O+ of the electronic component is in close contact with a metal languet of a positive cap of the output structural component;

The electronic component implements functions of output voltage clamp and adjustment, external voltage fluctuation absorption and reduction, reverse overvoltage protection, charge management, charge protection and discharge protection; specifically, the output clamp circuit implements the function of output voltage clamp and adjustment, the reverse absorption circuit implements the function of external voltage fluctuation absorption and reduction, the reverse overvoltage bleeder circuit implements the function of reverse overvoltage protection, and the PCB baffle implements good limit and support functions of the PCB substrate.

The charge management circuit includes a charge management chip U1, a first resistor R1, a second resistor R2, a third resistor R3, a first capacitor C1, a second capacitor C2, a third capacitor C3 and a fourth capacitor C4; a VCC port of the charge management chip U1, one end of the first resistor R1, and one end of the second resistor R2 are respectively connected with the power supply positive connection point POW+ on the PCB substrate; the other end of the first resistor R1 is connected with an anode of a first light-emitting diode LED1; a cathode of the first light-emitting diode LED1 is connected with an STDBY port of the charge management chip U1; the other end of the second resistor R2 is connected with an anode of a second light-emitting diode LED2; a cathode of the second light-emitting diode LED2 is connected with a CHCC port of the charge management chip U1; the VCC port of the charge management chip U1 is respectively connected in series with the first capacitor C1 and the second capacitor C2, and then is connected with the ground connection point GND on the PCB substrate; a BAT port of the charge management chip U1 is respectively connected in series with the third capacitor C3 and the fourth capacitor C4, and then is connected with the ground connection point GND on the PCB substrate; and a PROG port of the charge management chip U1 is connected in series with the third resistor R3, and then is connected with the ground connection point GND on the PCB substrate. The first capacitor C1 and the second capacitor C2 are input voltage filter capacitors, and function to reduce input voltage disturbance and reduce input voltage interference; the third capacitor C3 and the fourth capacitor C4 are output voltage filter capacitors, and function to reduce output voltage ripple, and ensure normal operation of an internal sample circuit and a judgment logic circuit in the charge management chip U1. The charge management chip U1, the first resistor R1, the second resistor R2, the first light-emitting diode LED1 and the second light-emitting diode LED2 together constitute a charge indication circuit, wherein, when being charged, the second light-emitting diode LED2 is lit, and the first light-emitting diode LED1 is extinguished; when fully charged, the first light-emitting diode LED1 is lit, and the second light-emitting diode LED2 is extinguished; and the PROG port of the charge management chip U1 is a charge current setting end, which changes a magnitude of a charge current by changing a resistance value of the third resistor R3.

The charge and discharge protection circuit includes a battery protection chip U2, a fifth capacitor C5 and a sixth capacitor C6; a VM port of the battery protection chip U2 is connected with the BAT port of the charge management chip U1; a GND1 port, a GND2 port and a TIN port of the battery protection chip U2 are respectively connected with the ground connection point GND on the PCB substrate; a VCC port of the battery protection chip U2 is connected in series with the fifth capacitor C5, and then is connected with the ground connection point GND on the PCB substrate; a VDD port of the battery protection chip U2 is connected in series with the sixth capacitor C6, and then is connected with the ground connection point GND on the PCB substrate; a connection end of the sixth capacitor C6 and the VDD port of the battery protection chip U2 is connected with the positive tab connection point B+ on the PCB substrate; and a connection end of the sixth capacitor C6 and the ground connection point GND on the PCB substrate is connected with the negative tab connection point B− on the PCB substrate.

The output clamp circuit includes a first diode D1, an anode of the first diode D1 is connected with the VM port of the battery protection chip U2, a cathode of the first diode D1 is connected with the positive clamp output end O+ on the PCB substrate; and the first diode D1 can realize a clamp output with respect to an output voltage range, so that the output voltage range satisfies a required working voltage range of an electric appliance, to ensure normal operation of the electric appliance.

The reverse absorption circuit includes a second diode D2, a cathode of the second diode D2 is connected with the VM port of the battery protection chip U2, and an anode of the second diode D2 is connected with the positive clamp output end O+ on the PCB substrate;

The reverse overvoltage bleeder circuit includes a voltage-regulator tube DE1, a cathode of the voltage-regulator tube DE1 is connected with the VM port of the battery protection chip U2, and an anode of the voltage-regulator tube DE1 is connected with the ground connection point GND on the PCB substrate.

The second diode D2 is connected in series between the positive clamp output end and an output port of the battery protection chip U2; when the electric appliance operates to generate a pulsating voltage superimposed on a power supply voltage, the second diode D2 is turned on, and a pulse voltage generated by the electric appliance charges the battery through the second diode D2 to implement energy recovery, and at a same time clamps a value of the power supply voltage to prevent a high voltage generated by the operating electric appliance from causing damage to the electric appliance; the voltage-regulator tube DE1 bridges over the output port of the battery protection chip and the ground connection point GND, to perform overvoltage protection on the output port of the battery protection chip; and when a charge voltage with which a pulse generated by the electric appliance charges the battery through the second diode D2 is excessively high, the voltage-regulator tube DE1 is quickly turned on, and clamps the voltage below a safe voltage.

Further, a lower end surface of the PCB substrate is vertically provided with protruding blocks, the PCB baffle is provided with via holes, and the protruding blocks of the PCB substrate are fittingly clamped within the via holes of the PCB baffle. The number of protruding blocks on the PCB substrate may be designed according to needs, the number of via holes on the PCB baffle varies according to the number of protruding blocks, and a shape of the via hole is correspondingly adjusted according to a shape of the protruding block.

Further, a surface of the PCB baffle that faces the battery core is not provided with a solder pad and a copper foil, and a thickness of the PCB baffle is 0.2 mm to 1.0 mm. The PCB baffle is placed between the battery core and the PCB substrate, and functions to electrically isolate and physically isolate electronic elements and components and electric circuits on the PCB substrate, so as to improve a safety factor and reduce a safety risk.

Further, the positive end of the battery core is connected with the positive tab connection point B+ on the electronic component through a positive lead or a positive tab, and the negative end of the battery core is connected with the negative tab connection point B− on the electronic component through a negative lead or a negative tab; and an outer edge of the PCB baffle is provided with two lead slots, to respectively let through the positive lead or the positive tab, and the negative lead or the negative tab, and clamp and fix the same within corresponding lead slots. A shape of the lead slot may be adjusted and designed according to needs, and the lead slot is provided, which can avoid a short circuit hidden danger caused by wear of an edge of the PCB baffle on an insulating layer of the positive lead or the positive tab, and the negative lead or the negative tab.

Further, an adhesive process is used for molding and fixing between the PCB substrate and the PCB baffle, and between the PCB baffle and the USB fixing structural part. When specifically fabricated, an adhesive is coated in a region on the PCB baffle that is enclosed by an edge of the lead slot, an edge of the via hole, and an edge of the PCB baffle, so that good bonding fixation of the PCB substrate, the PCB baffle and the USB fixing structural part can be implemented, which may reduce the number of times for coating the adhesive, and improve efficiency.

The output structural component includes a barrel cover, a positive cap and a clamp holder; a bottom of the positive cap is provided with a metal languet, the metal languet of the positive cap is mounted in an languet mounting slot of the clamp holder; the clamp holder is fittingly mounted in the barrel cover, and the positive cap passes through a top of the barrel cover and is partially exposed; when the output structural component is fittingly sleeved on the USB metal part of the intermediate connection structural component, it is actually that the languet mounting slot of the clamp holder is fittingly embedded in the USB metal part, and it is ensured that the positive clamp output end O+ of the electronic component is in close contact with the metal languet of the positive cap of the output structural component.

Respective elements and components on the charge management circuit, the charge and discharge protection circuit, the output clamp circuit, the reverse absorption circuit and the reverse overvoltage bleeder circuit may be soldered on the PCB substrate according to actual fabrication conditions; and the positive tab connection point B+, the negative tab connection point B−, the positive clamp output end O+, the power supply positive connection point POW+ and the ground connection point GND are generally implemented with the solder pad, and may be provided on one side or both sides of the PCB substrate according to needs.

As compared with the prior art, the induction garbage bin rechargeable battery according to the present disclosure has advantages below:

(1) Simplicity and practicality: the output voltage is clamped and adjusted with the output clamp circuit according to needs of use voltage of the electric appliance, so that the electric appliance operates in an optimal voltage range, which renders the design novel and practical;

(2) Safety and reliability: charge management, and overvoltage, over-discharge and overcurrent protection are comprised; electrical insulation and isolation between the battery core and the electronic component are implemented with the PCB baffle, to prevent a short circuit and eliminate a potential safety hazards of a short circuit of the battery core and the electronic component;

(3) High energy utilization rate: while providing an operation energy source of the electric appliance, it has the reverse absorption circuit for recovering feedback energy generated by the electric appliance, which improves the energy utilization rate, prolongs battery usage time, reduces the number of times for charging, and extends battery service life (4) Multiple protection: while recovering the feedback energy of the electric appliance, the reverse absorption circuit further absorbs high-voltage pulse and ripple generated by the electric appliance, to prevent further damage to the electric appliance due to excessively high working power supply voltage of the power supply of the electric appliance; the reverse overvoltage bleeder circuit further regulates the voltage, and prevents instantaneous voltage-regulation transient failure of the reverse absorption circuit which causes boost due to instantaneous recovered energy overload in case of a large current pulse, and further provides multiple and safer protection for stable operation of the system;

(5) High production efficiency: with reliable design and simple processes, the USB fixing structural part, the PCB substrate and the PCB baffle are molded and fixed by using a single adhesive process, which is simple and convenient to operate as compared with most splicing welding technologies of multi-PCB substrates, so as to improve production efficiency and reduce costs.

BRIEF DESCRIPTION OF THE DRAWINGS

FIG. 3 shows the output structural component 3 of FIG. 2 in details;

FIG. 4 shows the intermediate connection structural component 4 of FIG. 2 in details;

FIG. 5 shows the USB fixing structural part 41 of FIG. 4 in details;

FIG. 6A shows the electronic component 43 of FIG. 4 in details;

FIG. 6B shows the electronic component 43 of FIG. 4 in details;

FIG. 8 shows the PCB baffle 44 of FIG. 4 in details;

DETAILED DESCRIPTION

Hereinafter, the present disclosure will be further described in detail in conjunction with accompanying drawings and embodiments.

Embodiment 1

Figure 1:
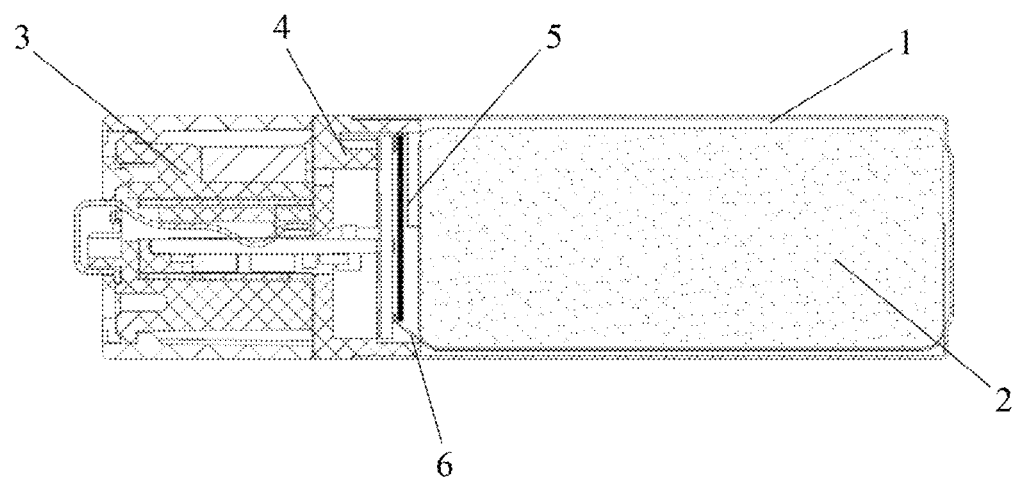
FIG. 1 is a cross-sectional schematic diagram of a rechargeable battery for an induction garbage bin according to Embodiment 1.
Figure 2:
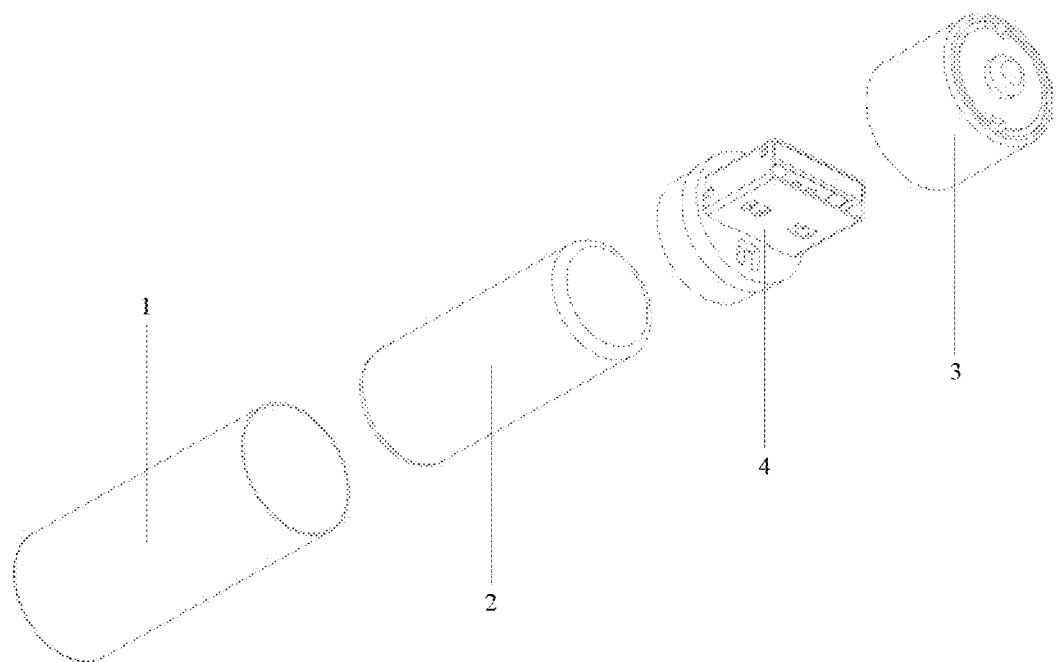
FIG. 2 is an exploded view of the inductive dustbin rechargeable battery according to Embodiment 1.
Figure 3:
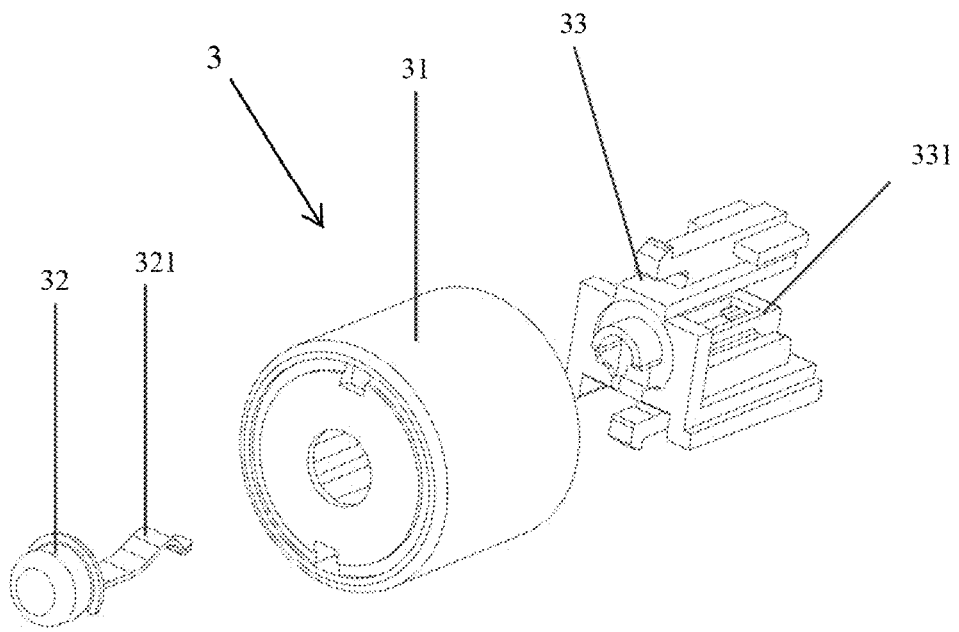
FIG. 3 is an exploded view of an output structural component according to Embodiment 1.
Figure 4:
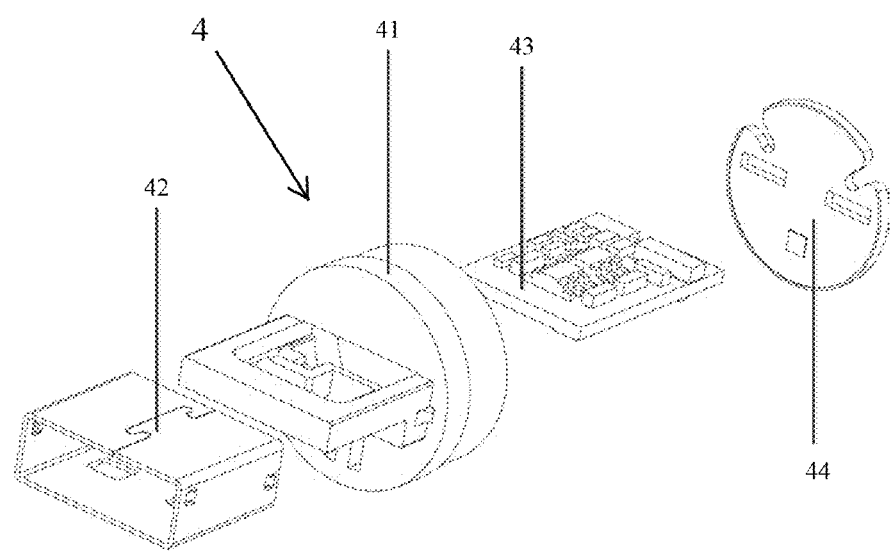
FIG. 4 is an exploded view of an intermediate connection structural component according to Embodiment 1.
Figure 5:
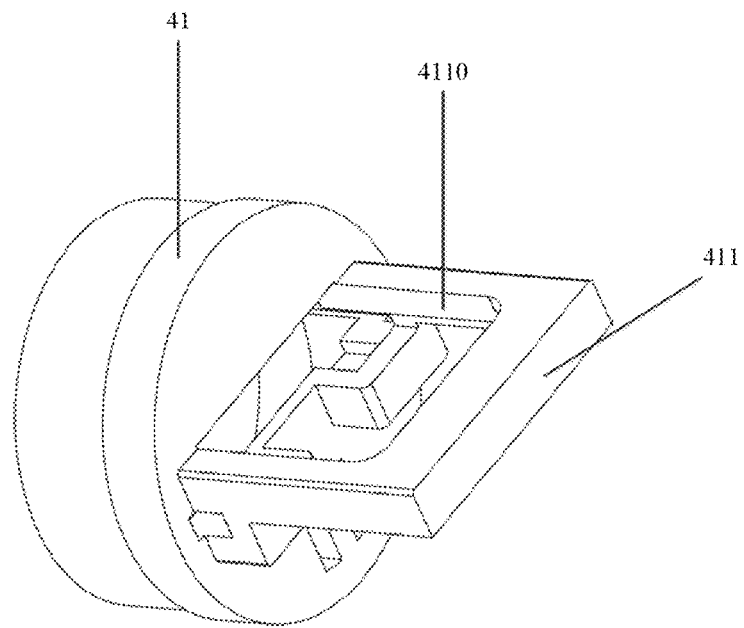
FIG. 5 is a structural schematic diagram of a USB fixing structural part according to Embodiment 1.
Figure 6A:
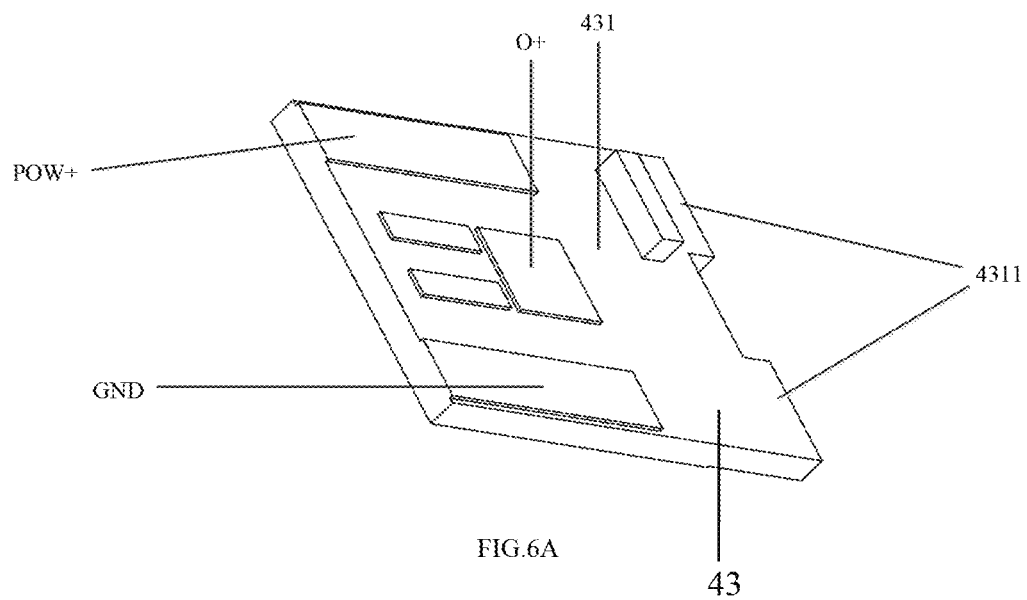
FIG. 6A is a front schematic diagram of a PCB substrate according to Embodiment 1.
Figure 6B:
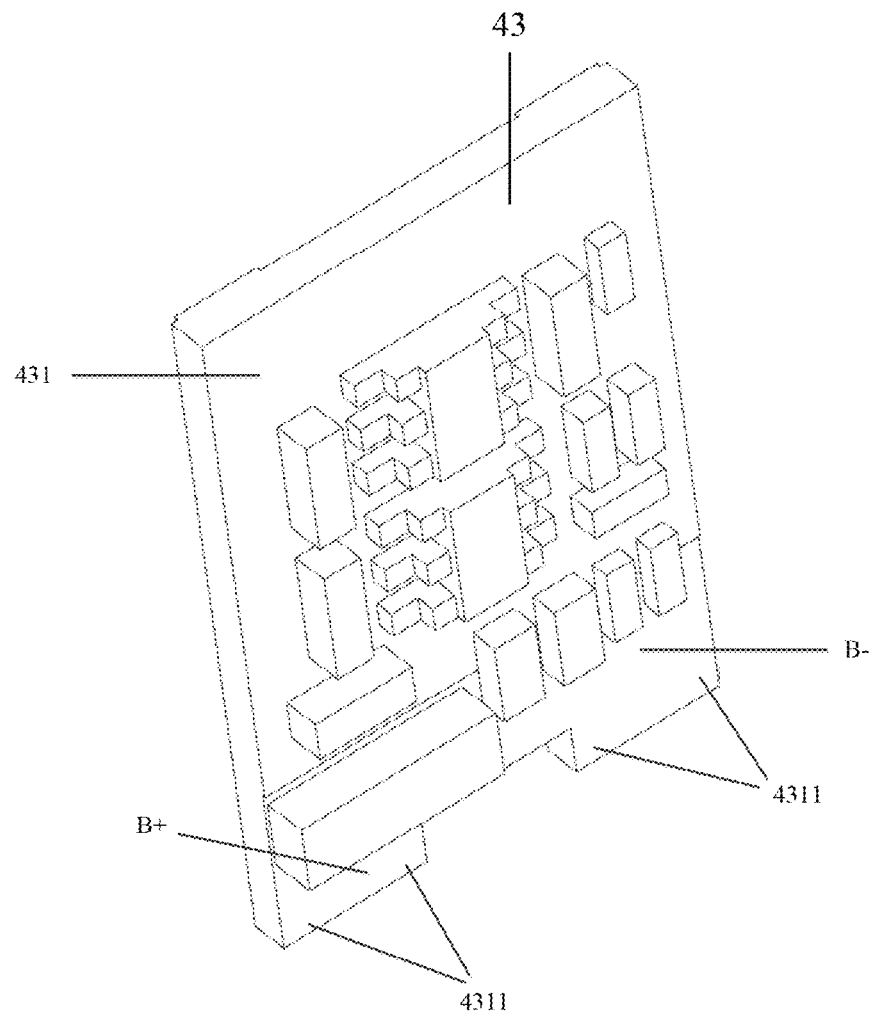
FIG. 6B is a rear schematic diagram of the PCB substrate according to Embodiment 1.
Figure 7:
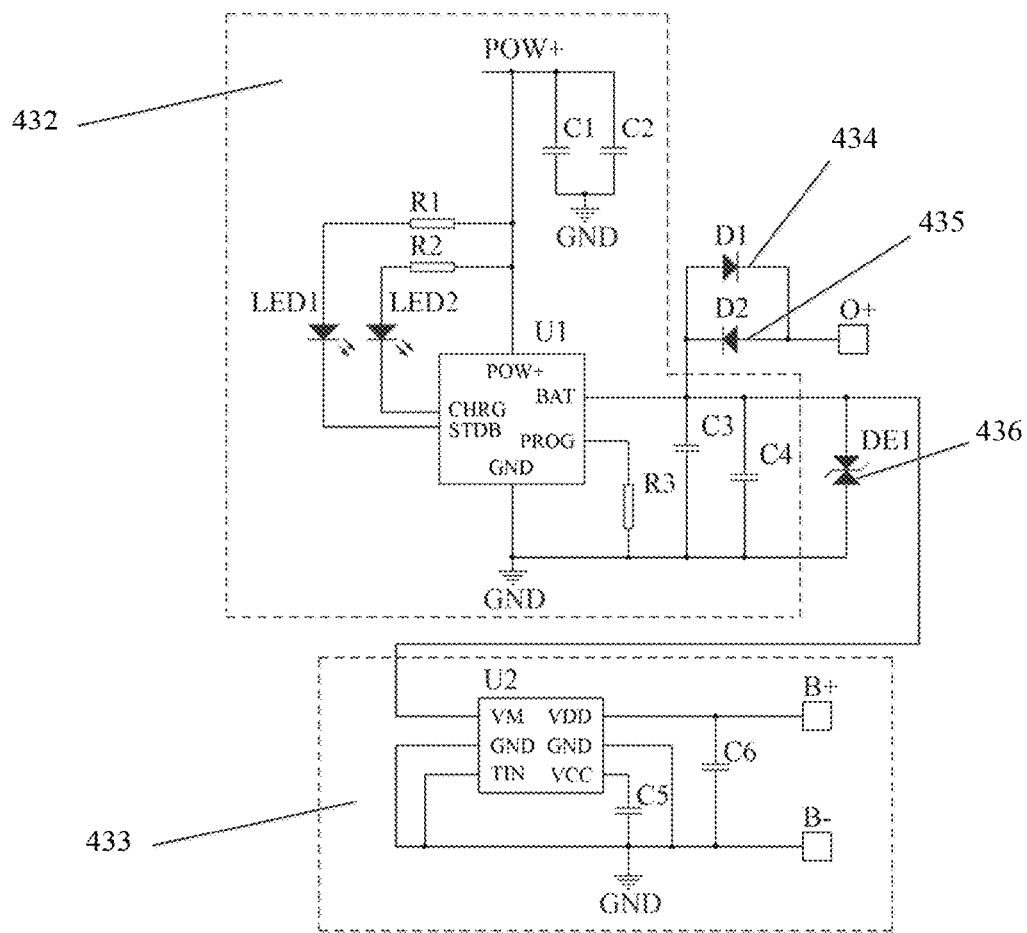
FIG. 7 is a circuit schematic diagram of an electronic component according to Embodiment 1.

A rechargeable battery for an induction garbage bin is provided, which is cylindrical and specified as follows: the battery has a diameter≤14.5 mm and a height≤50.5 mm, has a USB charge function (input DC: 4.25 V to 6.5 V; maximum charge current: 600 mA; battery charge voltage: 4.21±0.030 V), as well as functions of charge management and charge and discharge protection, and functions of clamp output and reverse absorption protection, as shown in FIG. 1 and FIG. 2, comprises a steel shell 1 (outer diameter: 13.90±0.05 mm; inner diameter: 13.50±0.05 mm; height: 35.0±0.05 mm), a battery core 2, an output structural component 3 and an intermediate connection structural component 4; wherein, the battery core according to this embodiment is a polymer lithium ion single battery (model number: 13300; diameter: 13 mm; height: 30 mm; nominal voltage: 3.7 V; capacity: 450 mAh); the battery core is placed in the steel shell; as shown in FIG. 3, the output structural component 3 includes a barrel cover 31, a positive cap 32 and a clamp holder 33; a bottom of the positive cap 32 is provided with a metal languet 321; the metal languet 321 of the positive cap 32 is mounted within a languet mounting slot 331 of the clamp holder 33; the clamp holder 33 is fittingly mounted within the barrel cover 31; and the positive cap 32 passes through a top of the barrel cover 31 and is partially exposed;

As shown in FIG. 4, the intermediate connection structural component 4 includes a USB fixing structural part 41, a USB metal part 42 (which is a standard Type-A USB), an electronic component 43 and a PCB baffle 44; the USB fixing structural part 41 is a tubular structure having a hollow interior and an unclosed bottom, the USB fixing structural part 41 has an upper end outer diameter larger than a lower end outer diameter, and as shown in FIG. 5, a top of the USB fixing structural part 41 is vertically provided with a protruding portion of a door frame structure, and an inner side of the protruding portion is provided with an electronic component mounting slot 4110; as shown in FIG. 6A and FIG. 6B, the electronic component 43 includes a PCB substrate 431, a charge management circuit 432, a charge and discharge protection circuit 433, an output clamp circuit 434, a reverse absorption circuit 435 and a reverse overvoltage bleeder circuit 436; a lower end surface of the PCB substrate 431 is vertically provided with two protruding blocks 4311; the charge management circuit 432, the charge and discharge protection circuit 433, the output clamp circuit 434, the reverse overvoltage bleeder circuit 436, a positive tab connection point B+ and a negative tab connection point B− are provided on a rear surface of the PCB substrate 431; and the reverse absorption circuit 435, a positive clamp output end O+, a power supply positive connection point POW+ and a ground connection point GND are provided on a front surface of the PCB substrate 431;

As shown in FIG. 7, the charge management circuit 432 includes a charge management chip U1 (model number: ME4055), a first resistor R1 (specification: 3 KΩ±1%), a second resistor R2 (specification: 5.1 KΩ±1%), a third resistor R3 (specification: 2.4 KΩ±1%), a first capacitor C1 (specification: 10 uF/10 V), a second capacitor C2 (specification: 0.1 uF/10 V), a third capacitor C3 (specification: 10 uF/10 V) and a fourth capacitor C4 (specification: 10 uF/10 V); a VCC port of the charge management chip U1, one end of the first resistor R1, and one end of the second resistor R2 are respectively connected with the power supply positive connection point POW+ on the PCB substrate; the other end of the first resistor R1 is connected with an anode of a first light-emitting diode LED1 (model number: HL0402USR); a cathode of the first light-emitting diode LED1 is connected with an STDBY port of the charge management chip U1; the other end of the second resistor R2 is connected with an anode of a second light-emitting diode LED2 (model number: HL0402USG); a cathode of the second light-emitting diode LED2 is connected with a CHCC port of the charge management chip U1; the VCC port of the charge management chip U1 is respectively connected in series with the first capacitor C1 and the second capacitor C2, and then is connected with the ground connection point GND on the PCB substrate; a BAT port of the charge management chip U1 is respectively connected in series with the third capacitor C3 and the fourth capacitor C4, and then is connected with the ground connection point GND on the PCB substrate; and a PROG port of the charge management chip U1 is connected in series with the third resistor R3, and then is connected with the ground connection point GND on the PCB substrate. The first capacitor C1 and the second capacitor C2 are input voltage filter capacitors, and function to reduce input voltage disturbance and reduce input voltage interference; the third capacitor C3 and the fourth capacitor C4 are output voltage filter capacitors, and function to reduce output voltage ripple, and ensure normal operation of an internal sample circuit and a judgment logic circuit in the charge management chip U1. The charge management chip U1, the first resistor R1, the second resistor R2, the first light-emitting diode LED1 and the second light-emitting diode LED2 together constitute a charge indication circuit, wherein, when being charged, the second light-emitting diode LED2 is lit, and the first light-emitting diode LED1 is extinguished; and when fully charged, the first light-emitting diode LED1 is lit, and the second light-emitting diode LED2 is extinguished.

The charge and discharge protection circuit 433 includes a battery protection chip U2 (model number: CT2015), a fifth capacitor C5 (specification: 0.1 uF/10 V) and a sixth capacitor C6 (specification: 0.1 uF/10 V); a VM port of the battery protection chip U2 is connected with the BAT port of the charge management chip U1; a GND1 port, a GND2 port and a TIN port of the battery protection chip U2 are respectively connected with the ground connection point GND on the PCB substrate; a VCC port of the battery protection chip U2 is connected in series with the fifth capacitor C5, and then is connected with the ground connection point GND on the PCB substrate; a VDD port of the battery protection chip U2 is connected in series with the sixth capacitor C6, and then is connected with the ground connection point GND on the PCB substrate; a connection end of the sixth capacitor C6 and the VDD port of the battery protection chip U2 is connected with the positive tab connection point B+ on the PCB substrate; and a connection end of the sixth capacitor C6 and the ground connection point GND on the PCB substrate is connected with the negative tab connection point B− on the PCB substrate.

The output clamp circuit 434 includes a first diode D1 (model number: 1N4007), an anode of the first diode D1 is connected with the VM port of the battery protection chip U2, and a cathode of the first diode D1 is connected with the positive clamp output end O+ on the PCB substrate;

The reverse absorption circuit 435 includes a second diode D2 (model number: 1N4007), a cathode of the second diode D2 is connected with the VM port of the battery protection chip U2, and an anode of the second diode D2 is connected with the positive clamp output end O+ on the PCB substrate;

The reverse overvoltage bleeder circuit 436 includes a voltage-regulator tube DE1 (model number: SFD52A05L01), a cathode of the voltage-regulator tube DE1 is connected with the VM port of the battery protection chip U2, and an anode of the voltage-regulator tube DE1 is connected with the ground connection point GND on the PCB substrate.

Figure 8:
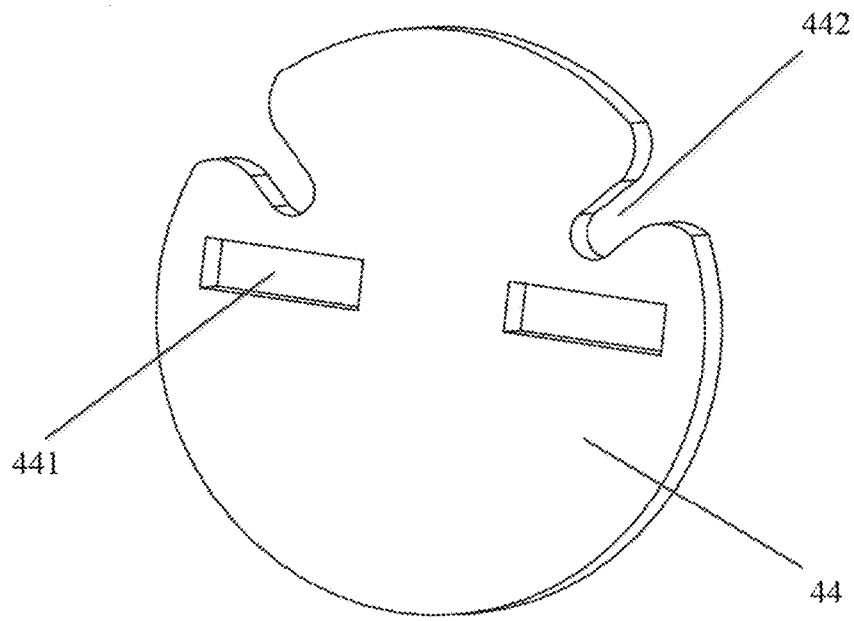
FIG. 8 is a structural schematic diagram of a PCB baffle according to Embodiment 1.

As shown in FIG. 8, the PCB baffle 44 is provided thereon with two rectangular via holes 441, an outer edge of the PCB baffle 44 is provided with two U-shaped lead slots 442, and the lead slots 442 are used to let through, clamp and fix a positive lead and a negative lead; a surface of the PCB baffle 44 that faces the battery core 2 is not provided with a solder pad and a copper foil, and a thickness of the PCB baffle is 0.2 mm to 1.0 mm; as shown in FIG. 4, the protruding blocks 4311 of the PCB substrate 431 are fittingly clamped in the corresponding via holes 441 of the PCB baffle 44 by using an adhesive process, an upper end of the PCB substrate 431 passes through the top of the USB fixing structural part 41 and is clamped within the electronic component mounting slot 4110, the PCB baffle 44 is fittingly mounted within the USB fixing structural part 41 by using an adhesive process, and the USB metal part 42 is fittingly sleeved on the protruding portion 411 of the USB fixing structural part 41; as shown in FIG. 1, a lower end of the USB fixing structural part 41 of the intermediate connection structural component 4 is fittingly sleeved on an open end of the steel shell 1 by using an adhesive process, a positive end of the battery core 2 is connected with the positive tab connection point B+ on the PCB substrate 431 through a positive lead 5 that passes through one of the lead slots 442 on the PCB baffle 44, a negative end of the battery core 2 is connected with the negative tab connection point B− on the PCB substrate 431 through a negative lead 6 that passes through the other lead slot 442 on the PCB baffle 44, the output structural component is fittingly clamped and sleeved on the USB metal part 42 of the intermediate connection structural component 4, and the positive clamp output end O+ of the electronic component 43 is in close contact with the metal languet 321 of the positive cap 32 of the output structural component 3, that is, the languet mounting slot 331 of the clamp holder 33 of the output structural component 3 is fittingly embedded in the USB metal part 42, and it is ensured that the positive clamp output end O+ of the electronic component 43 is in close contact with the metal languet 321 of the positive cap 32 of the output structural component 3.

The electronic component 43 implements functions of clamp adjustment on output voltage, absorption and reduction of external voltage fluctuation, reverse overvoltage protection, charge management, charge protection and discharge protection; specifically, the output clamp circuit 434 implements the function of clamp adjustment on output voltage, the reverse absorption circuit 435 implements the function of absorption and reduction of external voltage fluctuation, the reverse overvoltage bleeder circuit 436 implements the function of reverse overvoltage protection, and the PCB baffle 44 implements good limit and support functions of the PCB substrate 431.

In the PCB substrate according to this Embodiment, the functions for battery charge management, charge and discharge process protection (overvoltage protection, undervoltage protection, overcurrent protection, clamp output, reverse absorption, reverse overvoltage protection) are specifically: overcharge protection (overcharge detection voltage: 4.30±0.05 V; overcharge release voltage: 4.10±0.05 V; and overcharge voltage detection delay time≤1.2 S), over-discharge protection (over-discharge detection voltage: 2.50±0.050 V; over-discharge release voltage: 2.90±0.10 V; and over-discharge voltage detection delay time≤140 mS), overcurrent protection (over-discharge detection current: 2.5 A to 4.5 A; and over-discharge current detection delay timed≤11 mS), short circuit protection (load short-circuit detection current: 10 A to 30 A; and load short-circuit current detection delay time≤360 μS); the output clamp circuit in the PCB substrate is used to clamp the output voltage, to guarantee an output function with a battery output voltage ranging from 3.7±0.10 V to 1.9±0.10 V, and a maximum current of 0.5 A.

When actually fabricated, the battery core is covered with an outer film; the protruding blocks of the PCB substrate are fittingly clamped in the corresponding via holes of the PCB baffle by using an adhesive process; then, the positive lead and the negative lead of the positive end of the battery core respectively pass through the lead slots of the PCB baffle, and are correspondingly soldered together with the positive tab connection point B+ and the negative tab connection point B− on the PCB substrate; next, the PCB baffle assembled with the PCB substrate is fittingly mounted within the USB fixing structural part by using an adhesive process, the upper end of the PCB substrate passes through the top of the USB fixing structural part and is clamped within the electronic component mounting slot, and the USB metal part is fittingly sleeved on the protruding portion of the USB fixing structural part; thereafter, the lower end of the USB fixing structural part of the entire intermediate connection structural component is fittingly sleeved on the open end of the steel shell by using an adhesive process; and finally, the languet mounting slot of the clamp holder of the output structural component is fittingly embedded in the USB metal part, and it is ensured that the positive clamp output end O+ of the electronic component is in close contact with the metal languet of the positive cap of the output structural component, so that fabrication of the rechargeable battery for an induction garbage bin is completed. When the rechargeable battery for an induction garbage bin needs to be charged, the output structural component is taken out, and the USB metal part of the intermediate connection structural component is directly inserted into a corresponding standard USB charger or portable source, so that the power supply positive connection point POW+ and the ground connection point GND of the electronic component in the intermediate connection structural component are correspondingly connected with the VCC port and the GND port of the corresponding standard USB charger or portable source, to start charging.

Figure 9:
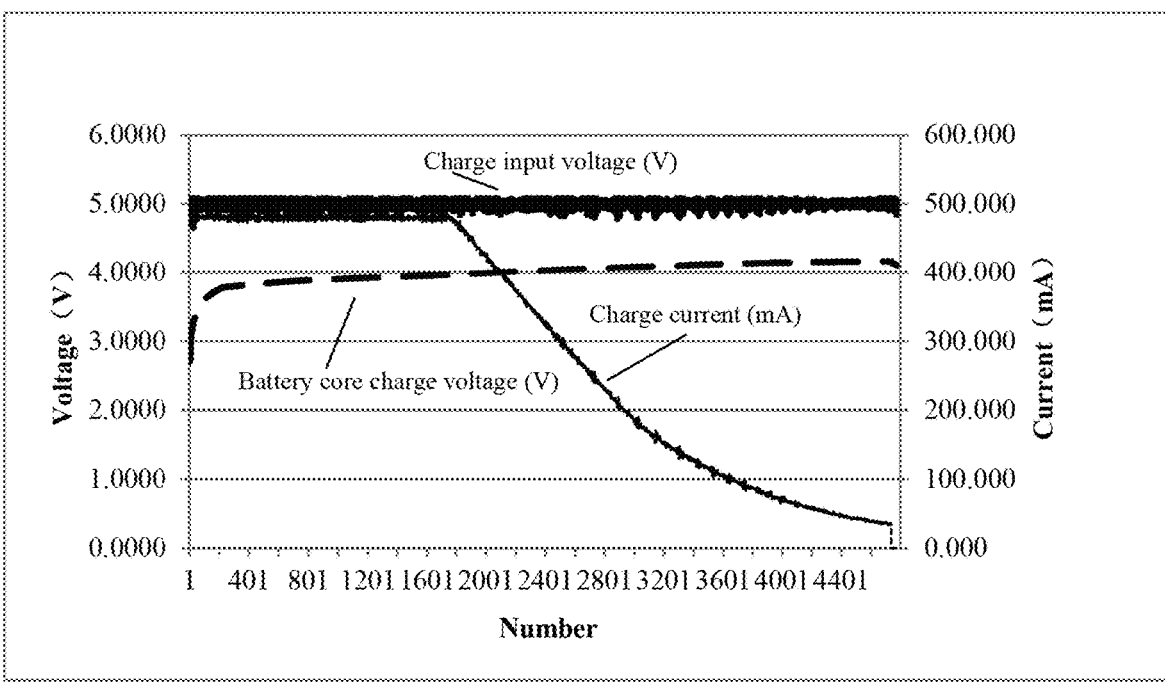
FIG. 9 is a curve chart of relationship of charge input voltage-battery core charge voltage-charge current-charge time of the rechargeable battery for an induction garbage bin according to Embodiment 1.

After the rechargeable battery for an induction garbage bin according to this embodiment has residual electricity completely discharged, it is charged with a universal USB-A charger through the USB metal part; a charge input voltage (a voltage of the power supply positive connection point to the ground, which indicates a direct-current power supply voltage for charging the battery), a battery core charge voltage (a voltage between the positive tab connection point B+ on the PCB substrate and the negative tab connection point B− on the PCB substrate) and a charge current are monitored during the charging process; and a curve chart of relationship of charge input voltage-battery core charge voltage-charge current-charge time is shown in FIG. 9. Time for the entire charging process is 79 minutes; the charge input voltage is a 5 V constant voltage; the battery core charge voltage rises from initial 2.7 V to final 4.17 V; the charge current is a 480 mA constant current at the beginning, which starts to drop after charging for 30 minutes, and until charging is ended, becomes 0 mA. Total charge capacity of the entire battery core amounts to 490 mAh. It can be known from FIG. 9 that the rechargeable battery for an induction garbage bin implements a DC 5 V direct-current charge function with a USB interface, and when charged to 4.17 V, it can turn off the charge current, and implement a normal charge management function.

Figure 10:
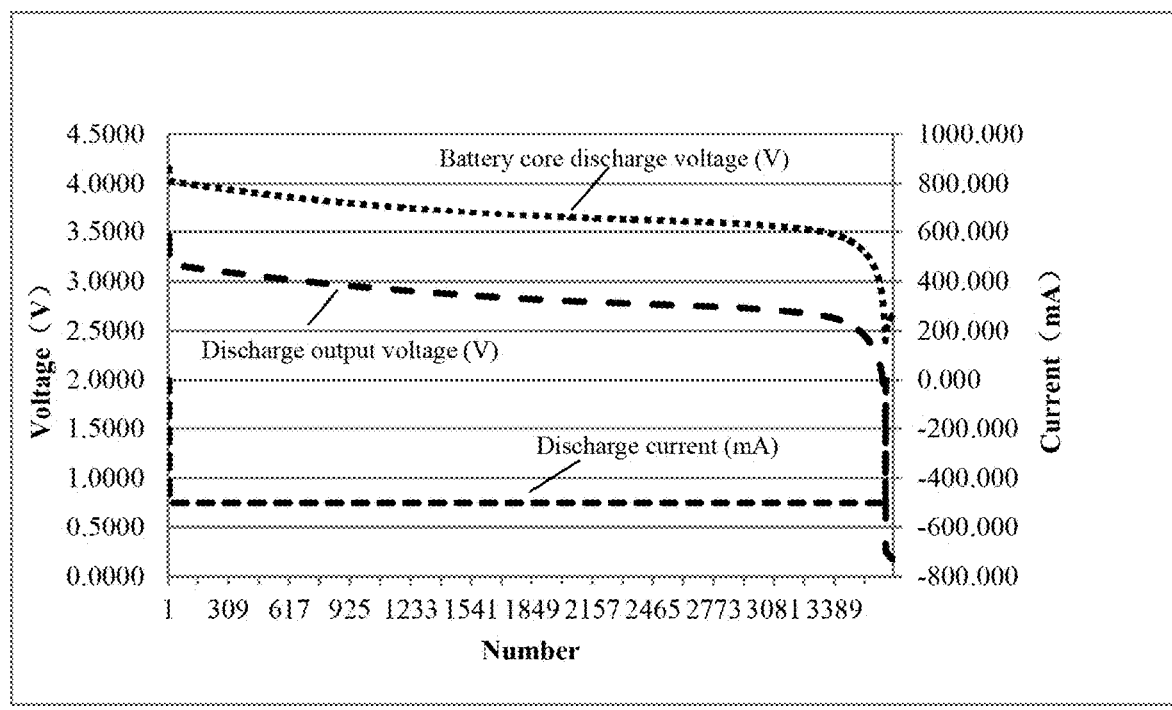
FIG. 10 is a curve chart of relationship of discharge output voltage-battery core discharge voltage-discharge current-discharge time of the rechargeable battery for an induction garbage bin according to Embodiment 1.

The fully charged induction garbage bin rechargeable battery is discharged through the positive cap (a positive electrode) of the output structural component and the steel shell (a negative electrode) at a constant current of 500 mA; a discharge output voltage (a voltage of a positive output end to the ground when the battery is operating with load), a battery core discharge voltage (a voltage between the positive tab connection point B+ on the PCB substrate and the negative tab connection point B− on the PCB substrate) and a discharge current are monitored during the discharging process; and a curve chart of relationship of discharge output voltage-battery core discharge voltage-discharge current-discharge time is shown in FIG. 10. Time for the entire discharging process is 61 minutes; the discharge output voltage ranges between 3.18 V and 1.68 V, and instantaneously drops to 0 V when discharging is ended; the battery core discharge voltage gradually decreases from initial 4.15 V, and until the voltage reaches 2.39 V, suddenly starts to rebound, which indicates that an undervoltage protection condition is triggered, so that a protection IC turns off a discharge loop to terminate discharging; the discharge current is 500 mA at the very beginning, and after discharging for 61 minutes, instantaneously drops to 0. Total discharge capacity of the entire battery core amounts to 530 mAh. It can be known from FIG. 10 that the battery implements functions of clamp output and discharge protection.

It should be noted that, although this embodiment is described with the lithium ion battery of 3.4 V to 1.7 V clamp voltage output as an example, it is also applicable to a battery of a larger output voltage or a smaller output voltage, and working conditions that require a larger output range or a smaller output range, for example, a lithium ion battery with clamp voltage output of 4 V to 2.2 V, 3.3 V to 1.4 V, etc.

The foregoing embodiments merely are preferred embodiments of the present disclosure, and it should be noted that, those skilled in the art can make improvements and modifications without departing from the principles of the present disclosure, and these improvements and modifications should also be considered to fall within the scope of the present disclosure.

The invention claimed is:

1. A rechargeable battery for an induction garbage bin, comprising a steel shell, a battery core, an output structural component and an intermediate connection structural component, the battery core being provided in the steel shell, wherein, the intermediate connection structural component includes a USB fixing structural part, a USB metal part, an electronic component and a PCB baffle; the USB fixing structural part is a tubular structure having a hollow interior and an unclosed bottom, the USB fixing structural part has an upper end outer diameter larger than a lower end outer diameter, a top of the USB fixing structural part is vertically provided with a protruding portion of a door frame structure, and an inner side of the protruding portion is provided with an electronic component mounting slot; the electronic component includes a PCB substrate, a charge management circuit, a charge and discharge protection circuit, an output clamp circuit, a reverse absorption circuit and a reverse overvoltage bleeder circuit; the charge management circuit, the charge and discharge protection circuit, the output clamp circuit, the reverse absorption circuit and the reverse overvoltage bleeder circuit are all provided on the PCB substrate; the PCB substrate is provided thereon with a positive tab connection point, a negative tab connection point, a positive clamp output end, a power supply positive connection point and a ground connection point; a lower end of the PCB substrate is mounted on the PCB baffle, and an upper end of the PCB substrate passes through the top of the USB fixing structural part and is clamped within the electronic component mounting slot; the PCB baffle is fittingly mounted within the USB fixing structural part; the USB metal part is fittingly sleeved on the protruding portion of the USB fixing structural part; the lower end of the USB fixing structural part of the intermediate connection structural component is fittingly sleeved on an open end of the steel shell; a positive end of the battery core is connected with the positive tab connection point on the PCB substrate, a negative end of the battery core is connected with the negative tab connection point on the PCB substrate; the output structural component is fittingly clamped and sleeved on the USB metal part of the intermediate connection structural component; and the positive clamp output end of the electronic component is in close contact with a metal languet of a positive cap of the output structural component;

the output clamp circuit implements a function of output voltage clamp and adjustment, the reverse absorption circuit implements a function of external voltage fluctuation absorption and reduction, the reverse overvoltage bleeder circuit implements a function of reverse overvoltage protection, and the PCB baffle implements good limit and support functions of the PCB substrate; wherein the charge management circuit includes a charge management chip, a first resistor, a second resistor, a third resistor, a first capacitor, a second capacitor, a third capacitor and a fourth capacitor; a VCC port of the charge management chip, one end of the first resistor, and one end of the second resistor are respectively connected with the power supply positive connection point on the PCB substrate; the other end of the first resistor is connected with an anode of a first light-emitting diode; a cathode of the first light-emitting diode is connected with an STDBY port of the charge management chip; the other end of the second resistor is connected with an anode of a second light-emitting diode; a cathode of the second light-emitting diode is connected with a CHCC port of the charge management chip; the VCC port of the charge management chip is respectively connected in series with the first capacitor and the second capacitor, and then is connected with the ground connection point on the PCB substrate; a BAT port of the charge management chip is respectively connected in series with the third capacitor and the fourth capacitor, and then is connected with the ground connection point on the PCB substrate; and a PROG port of the charge management chip is connected in series with the third resistor, and then is connected with the ground connection point on the PCB substrate.

2. The rechargeable battery for an induction garbage bin according to claim 1, wherein, the charge and discharge protection circuit includes a battery protection chip, a fifth capacitor and a sixth capacitor; a VM port of the battery protection chip is connected with the BAT port of the charge management chip; a GND1 port, a GND2 port and a TIN port of the battery protection chip are respectively connected with the ground connection point on the PCB substrate; a VCC port of the battery protection chip is connected in series with the fifth capacitor, and then is connected with the ground connection point on the PCB substrate; a VDD port of the battery protection chip is connected in series with the sixth capacitor, and then is connected with the ground connection point on the PCB substrate; a connection end of the sixth capacitor and the VDD port of the battery protection chip is connected with the positive tab connection point on the PCB substrate; and a connection end of the sixth capacitor and the ground connection point on the PCB substrate is connected with the negative tab connection point on the PCB substrate.

3. The rechargeable battery for an induction garbage bin according to claim 2, wherein, the output clamp circuit includes a first diode, an anode of the first diode is connected with the VM port of the battery protection chip, and a cathode of the first diode is connected with the positive clamp output end on the PCB substrate;

the reverse absorption circuit includes a second diode, a cathode of the second diode is connected with the VM port of the battery protection chip, and an anode of the second diode is connected with the positive clamp output end on the PCB substrate;

the reverse overvoltage bleeder circuit includes a voltage-regulator tube, a cathode of the voltage-regulator tube is connected with the VM port of the battery protection chip, and an anode of the voltage-regulator tube is connected with the ground connection point on the PCB substrate.

4. The rechargeable battery for an induction garbage bin according to claim 1, wherein, a lower end surface of the PCB substrate is vertically provided with protruding blocks, the PCB baffle is provided with via holes, and the protruding blocks of the PCB substrate are fittingly clamped within the via holes of the PCB baffle.

5. The rechargeable battery for an induction garbage bin according to claim 4, wherein, a surface of the PCB baffle that faces the battery core is not provided with a solder pad and a copper foil, and a thickness of the PCB baffle is 0.2 mm to 1.0 mm.

6. The rechargeable battery for an induction garbage bin according to claim 5, wherein, the positive end of the battery core is connected with the positive tab connection point on the electronic component through a positive lead or a positive tab, and the negative end of the battery core is connected with the negative tab connection point on the electronic component through a negative lead or a negative tab; and an outer edge of the PCB baffle is provided with two lead slots, to respectively let through the positive lead or the positive tab, and the negative lead or the negative tab, and clamp and fix the same within corresponding lead slots.

7. The rechargeable battery for an induction garbage bin according to claim 1, wherein, an adhesive process is used for molding and fixing between the PCB substrate and the PCB baffle, and between the PCB baffle and the USB fixing structural part.

* * * * *